United States Patent
Zhang et al.

(10) Patent No.: US 9,426,465 B2
(45) Date of Patent: Aug. 23, 2016

(54) SUB-PU LEVEL ADVANCED RESIDUAL PREDICTION

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 14/463,431

(22) Filed: Aug. 19, 2014

(65) Prior Publication Data

US 2015/0055704 A1    Feb. 26, 2015

Related U.S. Application Data

(60) Provisional application No. 61/868,027, filed on Aug. 20, 2013.

(51) Int. Cl.
| | |
|---|---|
| *H04N 19/51* | (2014.01) |
| *H04N 19/597* | (2014.01) |
| *H04N 19/52* | (2014.01) |
| *H04N 19/96* | (2014.01) |

(52) U.S. Cl.
CPC ........ *H04N 19/00696* (2013.01); *H04N 19/51* (2014.11); *H04N 19/52* (2014.11); *H04N 19/597* (2014.11); *H04N 19/96* (2014.11)

(58) Field of Classification Search
CPC ........... H04N 19/00696; H04N 19/52; H04N 19/51; H04N 19/597; H04N 19/00587; H04N 19/96
See application file for complete search history.

(56) References Cited

U.S. PATENT DOCUMENTS

| | | | | |
|---|---|---|---|---|
| 2012/0269270 | A1* | 10/2012 | Chen | H04N 19/597 375/240.16 |
| 2012/0269271 | A1* | 10/2012 | Chen | H04N 19/597 375/240.16 |
| 2013/0016787 | A1* | 1/2013 | Kim | H04N 19/176 375/240.16 |
| 2013/0058410 | A1* | 3/2013 | Yasugi | H04N 19/176 375/240.12 |
| 2013/0070854 | A1* | 3/2013 | Wang | H04N 19/436 375/240.16 |
| 2013/0176389 | A1* | 7/2013 | Chen | H04N 19/597 348/43 |
| 2013/0176390 | A1* | 7/2013 | Chen | H04N 19/597 348/43 |

(Continued)

OTHER PUBLICATIONS

Zhang, "Advanced residual prediction for multiview coding"— JCT3V-D0177—Apr. 26, 2013.*

(Continued)

*Primary Examiner* — Sath V Perungavoor
*Assistant Examiner* — Philip Dang
(74) *Attorney, Agent, or Firm* — Shumaker & Sieffert, P.A.

(57) ABSTRACT

A prediction unit (PU) of a coding unit (CU) is split into two or more sub-PUs including a first sub-PU and a second sub-PU. A first motion vector of a first type is obtained for the first sub-PU and a second motion vector of the first type is obtained for the second sub-PU. A third motion vector of a second type is obtained for the first sub-PU and a fourth motion vector of the second type is obtained for the second sub-PU, such that the second type is different than the first type. A first portion of the CU corresponding to the first sub-PU is coded according to advanced residual prediction (ARP) using the first and third motion vectors. A second portion of the CU corresponding to the second sub-PU is coded according to ARP using the second and fourth motion vectors.

30 Claims, 12 Drawing Sheets

(56) References Cited

U.S. PATENT DOCUMENTS

| | | | | |
|---|---|---|---|---|
| 2013/0182755 A1* | 7/2013 | Chen | ...................... | H04N 19/70 |
| | | | | 375/240.01 |
| 2013/0188716 A1* | 7/2013 | Seregin | .................. | H04N 19/56 |
| | | | | 375/240.16 |
| 2013/0202035 A1* | 8/2013 | Chen | ................ | H04N 19/00781 |
| | | | | 375/240.12 |

OTHER PUBLICATIONS

Zhang, "Further improvements on advanced residual prediction"—JCT3V-E0124—Aug. 2, 2013.*

An, "Sub-PU level inter-view motion prediction"—JCT3V-E0184—Aug. 2, 2013.*

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High Efficiency Video Coding (HEVC) text specification draft 9," 11th Meeting: Shanghai, CN, Oct. 10-19, 2012, JCTVC-K1003_v7, 290 pp.

Bross et al., "High Efficiency Video C(HEVC) text specification draft 10 (for FDIS & Last Call)," 12th Meeting: Geneva, CH, Jan. 14-23, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving ride°, Advanced video coding for generic audiovisual services, The International Telecommunication Union. Apr. 2015, 634 pp.

An et al., "3D-CE3.h related: Sub-PU level inter-view motion prediction," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16 ); URL: http://phenix.int-evry.fr/jct2/" No. JCT3V-E0184, XP030131217, 4 pp.

Zhang et al., "CE4: Advanced residual prediction for multiview coding," JCT-3V Meeting; Apr. 20-26, 2013; Incheon, KR; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-D0177, XP030130841, 10 pp.

Zhang et al., "CE4: Further improvements on advanced residual prediction," JCT-3V Meeting; Oct. 25-Nov. 1, 2013, Geneva, CH; (The Joint Collaborative Team on 3D Video Coding Extension Development of ISO/IEC JTC1/SC29/WG11 and ITU-T SG.16 ), No. JCT3V-F0123, XP030131548, 6 pp.

Zhang et al., "Further improvements on advanced residual prediction," JCT-3V Meeting; Jul. 27-Aug. 2, 2013; Vienna, AT; (The Joint Collaborative Team on 3D Video Coding Extension Development of ISO/IEC JTC1/SC29/WG11 and ITU-T SG.16); URL: http://phenix.int-evry.fr/jct21, No. JCT3V-E0124, XP030131138, 6 pp.

Tech et al., "3D-HEVC Test Model 4," (The Joint Collaborative Team on 3D Video Coding Extension Development of ISO/IEC JTC1/SC29/WG11 and ITU-T SG.16); Apr. 20-26, 2013; Document: JCT3V-D1005_v1, 56 pp.

Tech et al., "3D-HEVC Test Model 4," (The Joint Collaborative Team on 3D Video Coding Extension Development of ISO/IEC JTC1/SC29/WG11 and ITU-T SG.16); Apr. 20-26, 2013, Incheon, KR; Document: JCT3V-D1005_spec_v1, 106 pp.

An et al., "3D-CE3.h related: Sub-PU level inter-view motion prediction," (The Joint Collaborative Team on 3D Video Coding Extension Development of ISO/IEC JTC1/SC29/WG11 and ITU-T SG.16); Vienna, AT; Jul. 27-Aug. 2, 2013, Document: JCT3V-E0184, 4 pp.

An et al. "3D-CE3: Sub-PU level inter-view motion prediction," (The Joint Collaborative Team on 3D Video Coding Extension Development of ISO/IEC JTC1/SC29/WG11 and ITU-T SG.16); Oct. 25-Nov. 1, 2013, Document: JCT3V-F0110, 4 pp.

Zhang et al., "CE5.h: Disparity vector generation results," JCT2-A0097, JCT-3V Meeting; MPEG Meeting; Jul. 16-20, 2012; Stockholm, SE; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.

Sung et al., "3D-CE5.h: Simplification of disparity vector derivation for HEVC-based 3D video coding," JCT-3V Meeting; MPEG Meeting; Jul. 16-20, 2012; Stockholm, SE; The Joint Collaborative Team on 3D Video Coding Extension Development of ISO/IECJTC1/SC29/WG11 and ITU-T SG.16); URL: http://phenix.int-evry.fr/jct2/, No. JCT2-A0126, XP030130125, 4 pp.

Kang et al., "3D-CE5.h related: Improvements for disparity vector derivation," JCT-3V Meeting; MPEG Meeting; Oct. 13-19, 2012; Shanghai, CN; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-B0047, XP030130228, 4 pp.

Kang et al., "CE2.h related: CU-based Disparity Vector Derivation in 3D-HEVC," Qualcomm Incorporated, JCT3V-D0181, Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, 4 pp.

International Search Report and Written Opinion from International Application No. PCT/US2014/051905, dated October 21, 2014, 11 pp.

Response to Written Opinion dated Oct. 21, 2014, from International Application No. PCT/US2014/051905, filed on Jun. 18, 2015, 6 pp.

Second Written Opinion from International Application No. PCT/US2014/051905, dated Jul. 24, 2015, 6 pp.

Response to Second Written Opinion dated Jul. 24, 2015, from International Application No. PCT/US2014/051905, filed on Sep. 24, 2015, 4 pp.

International Preliminary Report on Patentability from International Application No. PCT/US2014/051905, dated Nov. 27, 2015, 8 pp.

* cited by examiner

SUB-PU LEVEL ADVANCED RESIDUAL PREDICTION

This application claims the benefit of U.S. Provisional Application No. 61/868,027, filed Aug. 20, 2013, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes video coding techniques. In particular, in some examples, the techniques are related to the coding of three-dimensional (3D) video content, which may include texture views and/or depth views.

In one example, a method of decoding video data comprises splitting a prediction unit (PU) of a coding unit (CU) into two or more sub-PUs including a first sub-PU and a second sub-PU, such that the sub-PUs of the PU are non-overlapping portions of the PU, determining a first motion vector of a first type for the first sub-PU and a second motion vector of the first type for the second sub-PU, determining a third motion vector of a second type for the first sub-PU and a fourth motion vector of the second type for the second sub-PU, such that the second type is different than the first type, decoding a first portion of the CU corresponding to the first sub-PU according to advanced residual prediction (ARP) using the first motion vector and the third motion vector, and decoding a second portion of the CU corresponding to the second sub-PU according to ARP using the second motion vector and the fourth motion vector.

In one example, a method of encoding video data comprises splitting a prediction unit (PU) of a coding unit (CU) into two or more sub-PUs including a first sub-PU and a second sub-PU, such that the sub-PUs of the PU are non-overlapping portions of the PU, obtaining a first motion vector of a first type for the first sub-PU and a second motion vector of the first type for the second sub-PU, obtaining a third motion vector of a second type for the first sub-PU and a fourth motion vector of the second type for the second sub-PU, such that the second type is different than the first type, encoding a first portion of the CU corresponding to the first sub-PU according to advanced residual prediction (ARP) using the first motion vector and the third motion vector, and encoding a second portion of the CU corresponding to the second sub-PU according to ARP using the second motion vector and the fourth motion vector.

In one example, a device for coding video data comprises a memory configured to store video data, and one or more processors. The one or more processors are coupled the memory and configured to: split a prediction unit (PU) of a coding unit (CU) into two or more sub-PUs including a first sub-PU and a second sub-PU, such that the sub-PUs of the PU are non-overlapping portions of the PU, obtain a first motion vector of a first type for the first sub-PU and a second motion vector of the first type for the second sub-PU, obtain a third motion vector of a second type for the first sub-PU and a fourth motion vector of the second type for the second sub-PU, such that the second type is different than the first type, code a first portion of the CU corresponding to the first sub-PU according to advanced residual prediction (ARP) using the first motion vector and the third motion vector, and code a second portion of the CU corresponding to the second sub-PU according to ARP using the second motion vector and the fourth motion vector.

In one example, a non-transitory computer-readable storage medium has stored thereon instructions. The instructions, when executed, cause at least one processor to: split a prediction unit (PU) of a coding unit (CU) into two or more sub-PUs including a first sub-PU and a second sub-PU, such that the sub-PUs of the PU are non-overlapping portions of the PU, obtain a first motion vector of a first type for the first sub-PU and a second motion vector of the first type for the second sub-PU, obtain a third motion vector of a second type for the first sub-PU and a fourth motion vector of the second type for the second sub-PU, such that the second type is different than the first type, code a first portion of the CU corresponding to the first sub-PU according to advanced residual prediction (ARP) using the first motion vector and the third motion vector, and code a second portion of the CU corresponding to the second sub-PU according to ARP using the second motion vector and the fourth motion vector.

The details of one or more examples are set forth in the accompanying drawings and the description below. Other features, objects, and advantages will be apparent from the description and drawings, and from the claims.

DETAILED DESCRIPTION

This disclosure describes various techniques for coding (e.g., encoding or decoding) of video content which may include texture views and depth views. The techniques may be performed, in some aspects, by a video encoder. In other aspects, the techniques may be performed by a video decoder. In addition, such methods could be performed in other devices, such as transcoders, media aware network elements (MANEs), or the like. In this disclosure, the techniques are described with respect to video encoders and decoders for purposes of illustration.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a video coding standard, High-Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). One recent Working Draft (WD) of HEVC, and referred to as HEVC WD8 hereinafter, is available from http://phenix.int-evry.fr/jet/doc_end_user/documents/11_Shanghai/wg11/JCTVC-K1003-v10.zip.

Another, more recent draft of HEVC, is referred to as "HEVC text specification draft 10" herein.

Multiview video coding (MVC) is an extension of H.264/Advanced Video Coding (AVC). The MVC specification is briefly discussed in the sections and sub-sections of this disclosure below.

Figure 1:
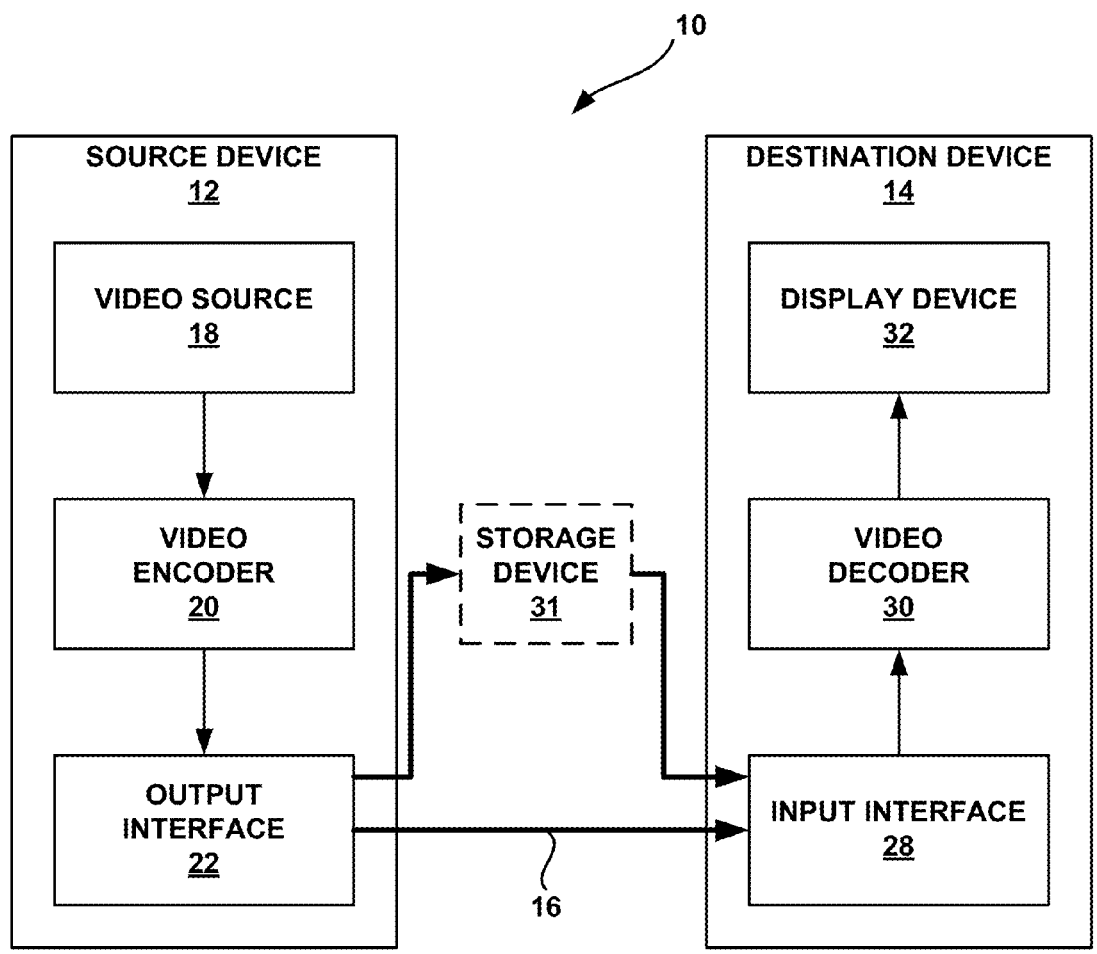
FIG. 1 is a block diagram illustrating an example video encoding and decoding system that may utilize techniques for depth-oriented inter-view motion vector prediction in video coding.

FIG. 1 is a block diagram illustrating an example video encoding and decoding system 10 that may be configured to implement or otherwise utilize techniques for sub-Prediction Unit (PU)-level advanced residual prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device, such as storage device 31. Similarly, encoded data may be accessed from the storage device 31 by input interface 28. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to perform techniques described herein for sub-PU-level advanced residual prediction. For example, video encoder 20 may be configured to encode signaling information in an encoded video bitstream to permit a video decoder, such as decoder 30 to decode the encoded video bitstream using techniques described herein for sub-PU-level advanced residual prediction. Video decoder 30 may be configured to perform techniques described herein for sub-PU-level advanced residual prediction. In other examples, a source device and a destination device may include other components or arrangements. For example, source device 12 may receive video data from an external video source 18, such as an external camera. Likewise, destination device 14 may interface with an external display device, rather than including an integrated display device.

In this manner, one or both of video encoder 20 and video decoder 30 may be examples of video coders configured to perform a method of coding video data, such as an example of the method of FIG. 4, discussed in greater detail below.

The illustrated system 10 of FIG. 1 is merely one example. Techniques described herein for sub-PU-level advanced residual prediction may be performed by any suitable digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the HEVC standard, and may generally conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable storage medium and execute the instructions in hardware causing one or more processors to perform the techniques of this disclosure. Each of video encoder 20 and video decoder 30 may be included in one or more encoders or decoders, either of which may be integrated as part of a combined encoder/decoder (CODEC) in a respective device.

The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. The upcoming HEVC standard also refers to LCUs as "coding tree units," or CTUs. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, to sub-PUs as discussed in greater detail below, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Inter-prediction generally involves predicting a block (e.g., a PU) using one or more motion vectors, which may include temporal and/or disparity motion vectors. Advanced residual prediction (ARP), as described in greater detail below, uses both temporal motion vectors and at least one of disparity vectors or disparity motion vectors to predict a block. More particularly, ARP techniques include calculating a predictor for a portion of a CU corresponding to a PU and calculating a residual predictor for the portion of the CU corresponding to the PU, and then coding the portion of the CU using the predictor, the residual predictor, and a residual, where the residual represents the difference between the portion of the CU and a combination of the predictor and the residual predictor. In addition, the residual predictor may be modified by applying a weighting factor.

In accordance with the techniques of this disclosure, a PU may be split into sub-PUs when a CU including the PU is coded using ARP. In accordance with the techniques of this disclosure, a sub-PU may be formed when a motion vector (either a temporal motion vector or a disparity motion vector) for a PU identifies, for ARP, a reference block including a first portion having temporal motion and/or disparity information that differs from temporal motion and/or disparity information for a second portion of the reference block. For example, for an inter-view reference block identified by a disparity motion vector of the PU, the inter-view reference block may cover two or more non-overlapped blocks of an inter-view reference picture, and the two non-overlapped blocks may have distinct temporal motion information. Distinct temporal motion information may refer to a situation in which a first portion has a first set of temporal motion information and a second portion has a second, different set of temporal motion information. Alternatively, distinct temporal motion information may refer to a situation in which a first portion has a first set of temporal motion information and a second portion has no temporal motion information available (e.g., because the second portion is coded using intra-prediction or because the temporal motion information for the second portion was corrupted). As another example, a temporal reference block may cover two or more non-overlapped PUs of a temporal reference picture, and the non-overlapped PUs may have distinct disparity vectors or disparity motion vectors (or disparity motion vectors and/or disparity information may be unavailable for one of the two non-overlapped blocks, as discussed above).

In this manner, sub-PUs may result from a PU having a motion vector (temporal or disparity) referring to a reference block having a first portion including motion/disparity information that differs from motion/disparity information for a second portion of the reference block. Accordingly, sub-PUs should not be interpreted as being the same as N×N PUs of a 2N×2N CU that is partitioned into the four N×N PUs (although the size of one sub-PU may be equal to the size of one N×N PU of a 2N×2N CU). For example, sub-PUs of a PU predicted using ARP at a sub-PU level would not necessarily include defined motion/disparity information that forms part of the syntax elements of the PU itself. Instead, the motion/disparity information for the sub-PUs of a PU coded using sub-PU level ARP may result from motion/disparity information for a reference block identified relative to the PU using the motion vector (whether a temporal motion vector or a disparity motion vector), e.g., assuming that two or more portions of the reference block have different motion/disparity information.

A sub-PU is a portion of a PU that includes part but not all of the PU, where one PU is split (i.e., partitioned or divided) into multiple sub-PUs in which each sub-PU is a non-overlapping portion of the PU. Each sub-PU is a block for which, for each block, there is a separate vector(s) to be used to locate the respective sub-PU's own corresponding/ reference block(s) during decoding. For each sub-PU, a separate determination is made to determine the corresponding reference block for sub-PU A sub-PU may not comprise an entire PU, even in the case of a PU that is smaller than a CU. For example, where a 2N×2N CU partitioned is four N×N PUs, these N×N PUs are PUs, not sub-PUs, but the N×N PUs themselves may be partitioned into sub-PUs, where each sub-PU of the PU is a non-overlapping portion of the PU. When a CU is divided into PUs that are smaller than the CU, each resulting PU constitutes a PU; the resulting PUs do not constitute sub-PUs. Again, each of these resulting PUs (i.e., as a result of the division of the CU) may be divided into sub-PUs, so that in this case there is a CU that is divided into PUs that are each smaller than the CU, and each PU is divided into sub-PUs that are each smaller than the PU.

In some examples, when ARP is being performed for the CU, while encoding the current PU, video encoder 20 splits the current PU into two or more sub-PUs, where each sub-PU is a non-overlapping portion of the CU. Then, for each sub-PU of the current PU, video encoder 20 generates a motion vector of a first type. Various examples of the first type of motion vector are discussed in greater detail below. Briefly, however, in some examples, the first type is a disparity motion vector, as discussed in greater detail below. In other examples, the first type is a disparity vector, as discussed in greater detail below. However, the disclosure is not so limited, and other types of motion vectors may be employed, as discussed in greater detail below.

After generating the motion vectors of the first type for each of the sub-PUs of the current PU, video encoder 20 then, for each of the sub-PUs, generates respective motion vector of a second type from the corresponding block identified by the respective first type of vector. Various examples of the second type of motion vector are discussed in greater detail below. Briefly, however, in some examples, the second type is a temporal motion vector, as discussed in greater detail below. However, the disclosure is not so limited, and various other types of motion vectors may also be employed, as discussed in greater detail below.

Video encoder 20 then encodes each portion of the CU that corresponds to each sub-PU of the PU according to ARP using the generated motion vectors associated with the respective sub-PU.

For example, in some examples, video encoder 20 splits a prediction unit (PU) of a coding unit (CU) into two or more sub-PUs including a first sub-PU and a second sub-PU, such that the two or more sub-PUs of the PU are non-overlapping portions of the PU. In some of these examples, video encoder 20 obtains a first motion vector of a first type for the first sub-PU and a second motion vector of the first type for the second sub-PU. Also, in some of these examples, video encoder 20 obtains a third motion vector of a second type for the first sub-PU and a fourth motion vector of the second type for the second sub-PU, such that the second type is different than the first type. Also, in some of these examples, video encoder 20 encodes a first portion of the CU corresponding to the first sub-PU according to advanced residual prediction (ARP) using the first motion vector and the third motion vector. Also, in some of these examples, video encoder 20 encodes a second portion of the CU corresponding to the second sub-PU according to ARP using the second motion vector and the fourth motion vector. In some examples, the first motion vector and the second motion vector are the same while the third and fourth motion vectors are different. In some other examples, the first motion vector and the second motion vector are different while the third and fourth motion vectors are the same. In some examples, the motion vectors of the first or second type are derived from other blocks instead of current sub-PU.

Although various descriptions above and below describe a particular order for certain actions, the disclosure is not so limited, and other suitable orders for actions discussed may be used within the scope and spirit of the disclosure. For example, as discussed above, in some examples, the video encoder generates a motion vector of a first type for each sub-PU in the current PU, and then the video encoder generates a motion vector of a second type for each sub-PU of the current PU, and the video encoder encodes each portion of the CU that corresponds to each sub-PU using the generated motion vectors associated with each respective sub-PU. However, in other examples, video encoder 20 first generates a motion vector of the first type for the first sub-PU of the current PU, and then the video encoder generates a motion vector of the second type for the first sub-PU of the PU, and then the video encoder encodes the portion of the CU that corresponds with the first sub-PU according to ARP using the generated motion vectors. Next, video encoder 20 performs similar actions for the second sub-PU of the PU, and so on.

In some examples, video decoder 30 splits a PU into two or more PUs, where each sub-PU is a non-overlapping portion of the CU. Then, for each sub-PU of the current PU, video decoder 30 obtains a motion vector of a first type. After generating the motion vectors of the first type for each of the sub-PUs of the current PU, video decoder 30 then, for each of the sub-PUs, generates a respective motion vector of a second type. In some examples, the motion vectors are the motion vectors previously generating during encoder, and are obtained by the decoder by retrieving them from the bitstream.

Video decoder 30 then decodes each portion of the CU that corresponds to each sub-PU of the PU according to ARP using the obtained vectors associated with the respective sub-PUs. Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, and/or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transform operations that produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and/or GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
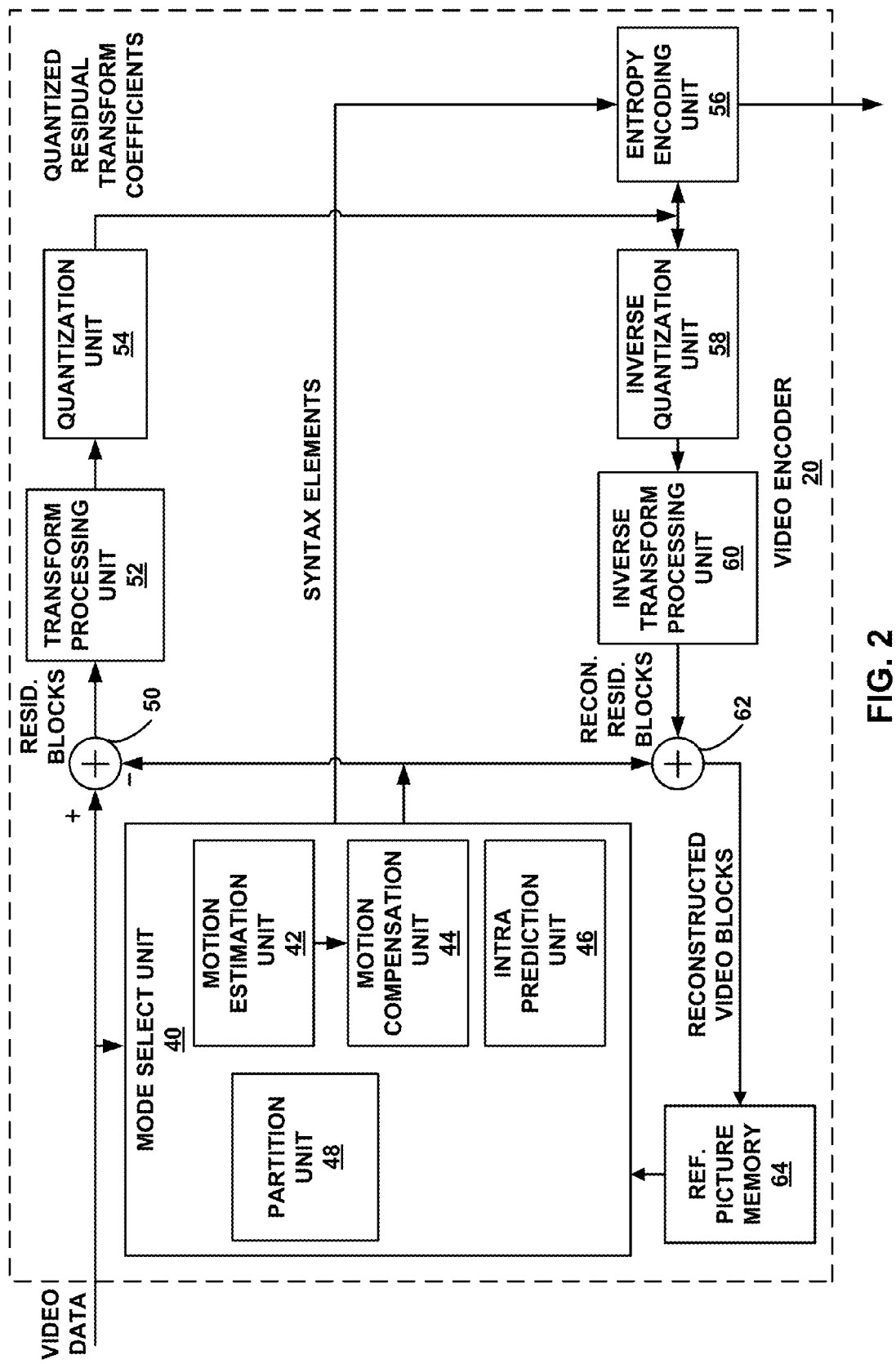
FIG. 2 is a block diagram illustrating an example of a video encoder that may utilize techniques for depth-oriented inter-view motion vector prediction in video coding.

FIG. 2 is a block diagram illustrating an example of video encoder 20 that may implement or otherwise utilize techniques described herein for sub-PU-level advanced residual prediction. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62.

A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video encoder 20 of FIG. 2 represents an example of a video encoder configured to perform various methods described in this disclosure. For instance, video encoder 20 may be an example of a video coder configured to perform a method of coding video data, such as the method of FIG. 4 and/or FIG. 11 as discussed in greater detail below.

In particular, in some examples, mode select unit 20 of video encoder 20 evaluates various iterative encoding passes to determine which combination of encoding modes and parameters results in the best rate-distortion characteristics. One of these passes for a CU (or a portion thereof, e.g., a portion corresponding to a PU) includes testing coding of the CU using ARP. Video encoder 20 applies ARP at a sub-PU level by partitioning each PU of the CU into sub-PUs.

In some examples, when ARP is being performed for the PU, video encoder 20 splits the current PU into two or more sub-PUs, where each sub-PU is a non-overlapping portion of the CU. Then, for each sub-PU, motion estimation unit 42 generates a motion vector of a first type for each of the sub-PUs of the PU. Various examples of the first type of motion vector are discussed in greater detail below. Briefly, however, in some examples, the first type is a disparity motion vector, as discussed in greater detail below. In other examples, the first type is a disparity vector, as discussed in greater detail below. However, the disclosure is not so limited, and other types of motion vectors may be employed, as discussed in greater detail below.

Video encoder 20 then generates a motion vector of a second type of each of the sub-PUs of the PU. Various examples of the second type of motion vector are discussed in greater detail below. Briefly, however, in some examples, the second type is a temporal motion vector, as discussed in greater detail below. However, the disclosure is not so limited, and various other types of motion vectors may also be employed, as discussed in greater detail below.

Video encoder 20 then encodes each portion of the CU that corresponds to each sub-PU of the PU according to ARP using the generated motion vectors associated with the respective sub-PU.

Motion compensation unit 44 may use the first motion vector to determine a reference block for a sub-PU of a PU that is encoded using ARP. Furthermore, motion compensation unit 44 may use the second motion vector to determine a corresponding block for the sub-PU, and apply the first motion vector to the corresponding block to determine a reference block for the corresponding block. Motion compensation unit 44 may then calculate a residual predictor for the sub-PU as the difference between the corresponding block and the reference block for the corresponding block. In some examples, the residual predictor may be modified by applying a weighting factor. Accordingly, summer 50 may calculate a residual block for the sub-PU as the difference between the original portion of the CU corresponding to the sub-PU, the reference block for the sub-PU, and the weighted residual predictor. Again, it should be noted that the first and second motion vectors may be different types of vectors. For example, the first motion vector may be a temporal motion vector and the second motion vector may be a disparity vector or a disparity motion vector. Alternatively, the first motion vector may be a disparity motion vector and the second motion vector may be a temporal motion vector.

In this manner, video encoder 20 represents an example of a device including a memory configured to store video data and one or more processors coupled the memory and configured to split a prediction unit (PU) of a coding unit (CU) into two or more sub-PUs including a first sub-PU and a second sub-PU, such that the sub-PUs of the PU are non-overlapping portions of the PU, obtain a first motion vector of a first type for the first sub-PU and a second motion vector of the first type for the second sub-PU, obtain a third motion vector of a second type for the first sub-PU and a fourth motion vector of the second type for the second sub-PU, such that the second type is different than the first type, code a first portion of the CU corresponding to the first sub-PU according to advanced residual prediction (ARP) using the first motion vector and the third motion vector, and code a second portion of the CU corresponding to the second sub-PU according to ARP using the second motion vector and the fourth motion vector.

Figure 3:
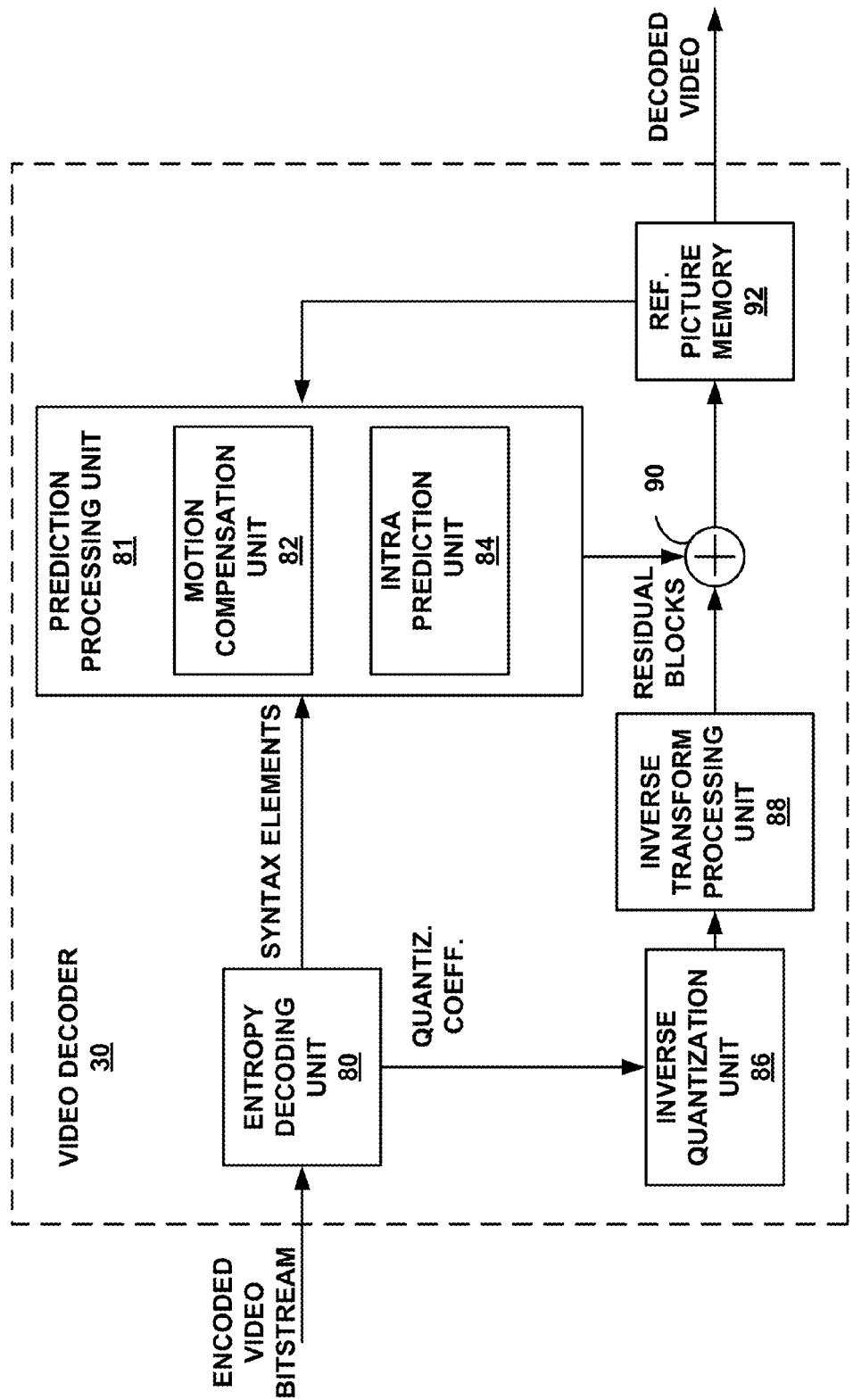
FIG. 3 is a block diagram illustrating an example of a video decoder that may utilize techniques for depth-oriented inter-view motion vector prediction in video coding.

FIG. 3 is a block diagram illustrating an example of video decoder 30 that may implement or otherwise utilize techniques for sub-PU-level advanced residual prediction in video coding. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

In some examples, ARP may be performed or not performed for each CU, where, in some examples, ARP is signaled for each CU for which ARP is to be performed. (In other examples, ARP may be signaled at some level other than the CU level.) When ARP is performed for a CU, it is performed at the sub-PU level. While video decoder 30 is decoding, it performs sub-PU ARP for each CU in which ARP is signaled.

In some examples, while decoding a PU of a CU in which ARP has been signaled to be performed, video decoder 30 splits the PU into two or more PUs, where each sub-PU is a non-overlapping portion of the CU. Then, for each sub-PU, video decoder 30 obtains a motion vector of a first type for each of the sub-PUs of the PU. Video decoder 30 then obtains a motion vector of a second type of each of the sub-PUs of the CU. In some examples, the motion vectors are the motion vectors previously generating during encoder, and are obtained by the decoder by retrieving them from the bitstream.

Video decoder 30 then decodes each portion of the CU that corresponds to each sub-PU of the PU according to ARP using the obtained motion vector.

In this manner, video decoder 30 represents an example of a device including a memory configured to store video data and one or more processors coupled the memory and configured to split a prediction unit (PU) of a coding unit (CU) into two or more sub-PUs including a first sub-PU and a second sub-PU, such that the sub-PUs of the PU are non-overlapping portions of the PU, obtain a first motion vector of a first type for the first sub-PU and a second motion vector of the first type for the second sub-PU, obtain a third motion vector of a second type for the first sub-PU and a fourth motion vector of the second type for the second sub-PU, such that the second type is different than the first type, code a first portion of the CU corresponding to the first sub-PU according to advanced residual prediction (ARP) using the first motion vector and the third motion vector, and code a second portion of the CU corresponding to the second sub-PU according to ARP using the second motion vector and the fourth motion vector.

Figure 4:
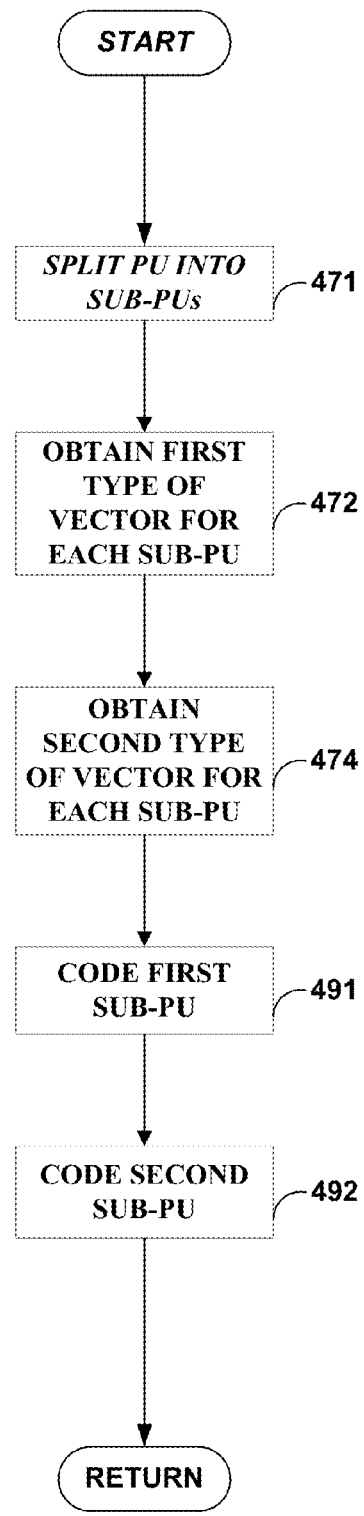
FIG. 4 is a flow diagram illustrating an example process for coding video data.

FIG. 4 is a flow diagram illustrating an example process (470) for coding video data. In some examples, acts performed in the process of FIG. 4 may be performed by a video coder, such as video encoder 20 or video decoder 30, although other video coding devices may be configured to perform the process of FIG. 4.

After a start block, the video coder splits a prediction unit (PU) of a coding unit into two or more sub-PUs including a first sub-PU and a second sub-PU, such that the sub-PUs of the PU are non-overlapping portions of the PU (471).

At block 471, the PU may be split into two or more sub-PUs in various different ways in different examples. In some examples, the PU may be split into two equally-sized sub-PUs, where each sub-PU is a separate half of the PU. In some examples, the PU may be split into four equally-sized square sub-PUs, where each sub-PU is a separate quarter of the PU. In some examples, the sub-PUs are each at least eight pixels by at least eight pixels in size. However, the disclosure is not so limited, and various other divisions of the PU into two or more sub-PUs may be employed, including sub-PUs of equal sizes relative to each other, sub-PUs of unequal sizes relative to each other, square-shaped sub-PUs, rectangle-shaped sub-PUs, PUs having shapes other than a square or rectangle shape, and/or the like.

The video coder than obtains a first motion vector of a first type for the first sub-PU and a second motion vector of the first type is for the second sub-PU (472).

At block 472, a first motion vector of a first type is obtained for the first sub-PU and a second motion vector of the first type is obtained for the second sub-PU. Various examples of the first and second motion vector are discussed in greater detail below. Briefly, however, in some examples, the first type is a disparity motion vector, as discussed in greater detail below. In other examples, the first type is a disparity vector, as discussed in greater detail below. However, the disclosure is not so limited, and other types of motion vectors may be employed, as discussed in greater detail below. In some examples, the same motion vector of the first type is obtained for each sub-PU. That is, the first and second motion vectors may comprise the same motion vector.

The video coder than obtains a third motion vector of a second type is obtained for the first sub-PU and a fourth motion vector of the second type is determined for the second sub-PU, such that the second type is different than the first type (474).

At block 474, a third motion vector of a second type is obtained for the first sub-PU and a fourth motion vector of the second type is obtained for the second sub-PU. Various examples of the third and fourth motion vector are discussed in greater detail below. Briefly, however, in some examples, the second type is a temporal motion vector, as discussed in greater detail below. However, the disclosure is not so limited, and various other types of motion vectors may also be employed, as discussed in greater detail below.

The video coder then codes a first portion of the CU corresponding to the first sub-PU is coded according to advanced residual prediction (ARP) using the first motion vector and the third motion vector (491). The video coder then codes a second portion of the CU corresponding to the second sub-PU is coded according to ARP using the second motion vector and the fourth motion vector (492). The process then advances to a return block, where other processing is resumed.

Some examples of the process of FIG. 4 are encoding processes. In some of these examples, at blocks 472 and 474, motion vectors are obtained by deriving and/or generating the motions vectors, as discussed in greater detail below, and at blocks 491 and 492, the portions of the CU are coded by encoding the portions of the CU. Other examples of the process of FIG. 4 are decoding process. In some of these examples, at blocks 472 and 474, motion vectors are obtained by retrieving them from the bitstream, and at blocks 491, the portion of the CU are coded by decoding the portions of the CU. However, the disclosure is not so limited, and various other examples may also be employed.

Figure 5:
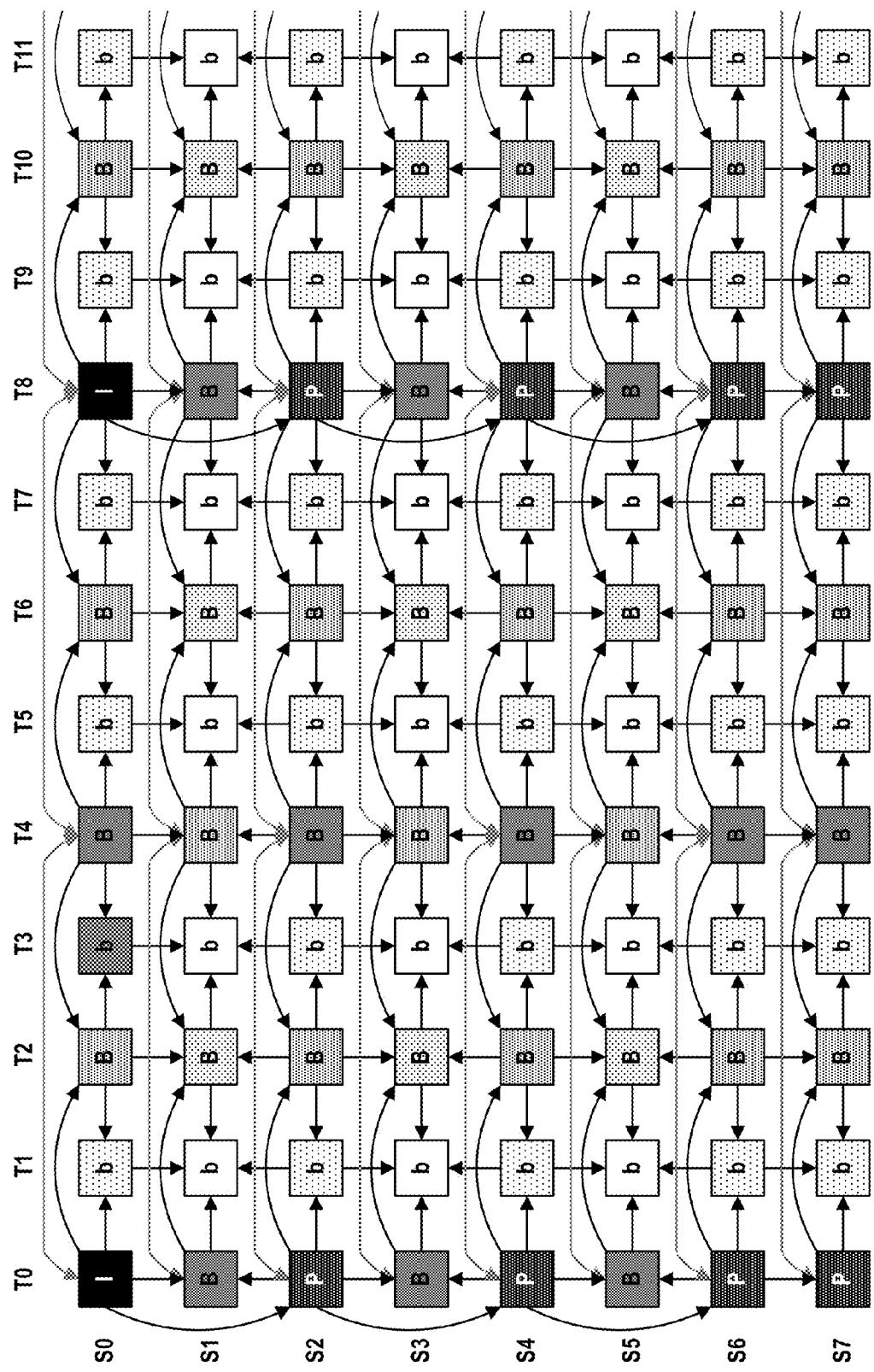
FIG. 5 is a conceptual diagram illustrating an example sub-PU MVC prediction pattern.

FIG. 5 is a conceptual diagram illustrating an example MVC prediction pattern. Inter-view prediction in MVC is described herein, which, in accordance with this disclosure, is herein performed at the sub-PU level in conjunction with ARP. An example MVC prediction (including both inter-picture prediction within each view and inter-view prediction) structure for multi-view video coding is shown in FIG. 5, where predictions are indicated by arrows, the pointed-to object using the pointed-from object for prediction reference.

In MVC, inter-view prediction is performed among pictures captured in the different views of the same access unit (i.e., with the same time instance) to remove correlation between views. A picture coded with inter-view prediction may be added into a reference picture list for the inter-view prediction of the other non-base views.

An inter-view prediction reference picture can be put in any position of a reference picture list in the same way with an inter prediction reference picture.

In the context of multiview video coding, there are two kinds of motion vectors. One is a normal motion vector pointing to temporal reference pictures and the corresponding temporal inter prediction is motion-compensated prediction (MCP). The other is a disparity motion vector (DMV) pointing to pictures in a different view (i.e., inter-view reference pictures) and the corresponding inter prediction is disparity-compensated prediction (DCP).

An HEVC based 3D video coding standard is described. Currently, a Joint Collaboration Team on 3D Video Coding (JCT-3C) of VCEG and MPEG is developing a 3-Dimensional Video (3DV) standard based on HEVC, for which part of the standardization efforts includes the standardization of the multiview video codec based on HEVC (MV-HEVC), and another part for 3D Video coding based on HEVC (3D-HEVC). For 3D-HEVC, new coding tools, including those in a coding unit/prediction unit level, for both texture and depth views may be included and supported. The latest software 3D-HTM for 3D-HEVC can be downloaded from the following link:

[3D-HTM version 7.0]: https://hevc.hhi.fraunhofer.de/svn/svn_3DVCSoftware/tags/HTM-7.0/

The latest reference software description as well as the working draft of 3D-HEVC is to be available as follows: Gerhard Tech, Krzysztof Wegner, Ying Chen, Sehoon Yea, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR , 20-26 Apr. 2013. It may be downloaded from the following link:

http://phenix.it-sudparis.eu/jct2/doc_end_user/documents/4_Incheon/wg11/JCT3V-D1005-v1.zip Neighboring Block Based Disparity Vector Derivation (NBDV) is described herein. The NBDV is used for a disparity vector derivation method in the 3D-HEVC that uses the texture-first coding order for all the views. In the current 3D-HEVC design, the disparity vector derived from NBDV may be further refined by retrieving the depth data from a reference view's depth map.

An NBDV overview is described. A disparity vector (DV) is used for an estimator of the displacement between two views. Because neighboring blocks share almost the same motion/disparity information in video coding, the current block can use the motion vector information in neighboring blocks as a good predictor. Following this idea, the NBDV uses the neighboring disparity information for estimating the disparity vector in different views.

Several spatial and temporal neighboring blocks are firstly defined. Each of the defined spatial and/or temporal neighboring blocks is then checked in a pre-defined order determined by the priority of the correlation between the current block and the candidate block. Once a disparity motion vector (e.g., a motion vector that points to an inter-view reference picture) is found in the candidates, the disparity motion vector is converted to a disparity vector and the associated view order index is also returned. Two sets of neighboring blocks are utilized. One set is from spatial neighboring blocks, and the other set is from temporal neighboring blocks.

NBDV in 3D-HEVC is described. 3D-HEVC firstly adopted the Neighboring Block (based) Disparity Vector (NBDV) method proposed in JCT3V-A0097. Implicit disparity vectors were included with a simplified NBDV in JCTVC-A0126. Additionally, in JCT3V-B0047, the NBDV is further simplified by removing the implicit disparity vectors stored in the decoded picture buffer, but also improved a coding gain with the RAP picture selection.

JCT3V-A0097: 3D-CE5.h: Disparity vector generation results, L. Zhang, Y. Chen, M. Karczewicz (Qualcomm).

JCT3V-A0126: 3D-CE5.h: Simplification of disparity vector derivation for HEVC-based 3D video coding, J. Sung, M. Koo, S. Yea (LG).

JCT3V-B0047: 3D-CE5.h related: Improvements for disparity vector derivation, J. Kang, Y. Chen, L. Zhang, M. Karczewicz (Qualcomm).

JCT3V-D0181: CE2: CU-based Disparity Vector Derivation in 3D-HEVC, J. Kang, Y. Chen, L. Zhang, M. Karczewicz (Qualcomm).

In accordance with the techniques of this disclosure, blocks of some pictures may be coded using ARP. More particularly, in accordance with these techniques, a PU of a block may be split into sub-PUs and coded using ARP. For example, a disparity motion vector of a PU (e.g., a PU of the B-picture in view S1 at time T2) may refer to an inter-view reference block in the B-picture of view S2 at time T2. The reference block may overlap two or more blocks, each with its own distinct motion/disparity information. For example, a first portion of the inter-view reference block may have a temporal motion vector that identifies a temporal reference block of the B-picture of view S2 at time T4, and a second portion of the inter-view reference block may have a temporal motion vector that identifies a different temporal reference block of the B-picture of view S2 at time T4. Rather than using only one of these two temporal motion vectors to identify a temporal reference block for the inter-view reference block, a video coder (e.g., video encoder 20 or video decoder 30) may code the PU as two sub-PUs, using both sets of motion/disparity information from the inter-view reference block according to ARP.

Figure 6:
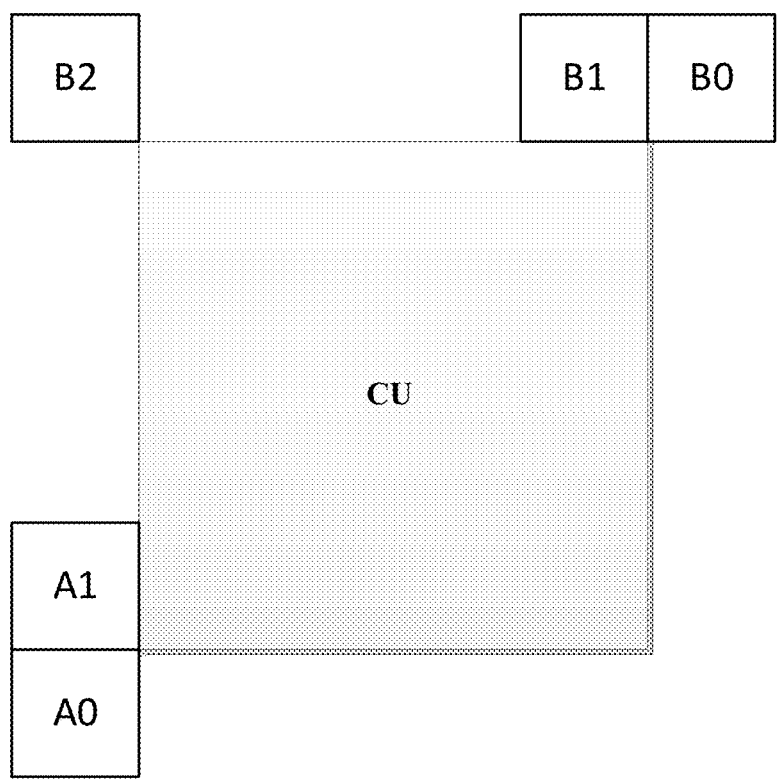
FIG. 6 is a conceptual diagram illustrating example spatial neighbors relative to a coding unit (CU) for sub-PU ARP.

FIG. 6 is a conceptual diagram illustrating example spatial neighbors relative to a coding unit (CU), according to NBDV. In an example of NBDV, five spatial neighboring blocks are used for disparity vector derivation", which, in accordance with the disclosure, may be performed in encoding and decoding at the sub-PU level in conjunction with ARP. The five spatial neighboring blocks are the below-left, left, above-right, above and above-left blocks of the coding unit (CU) covering current prediction unit (PU), as denoted by A0, A1, B0, B1 and B2, as shown in FIG. 6. It will be noted that they are the same as those used in the MERGE/AMVP modes in HEVC. Accordingly, no additional memory access is required.

For checking temporal neighboring blocks, a construction process of a candidate picture list is performed first. Up to two reference pictures from a current view may be treated as candidate pictures. A co-located reference picture is first inserted into the candidate picture list, followed by the rest of the candidate pictures in ascending order of reference index. When the reference pictures with the same reference index in both reference picture lists are available, the one in the same reference picture list of the co-located picture precedes the other one. For each candidate picture in the candidate picture list, three candidate regions are determined for deriving the temporal neighboring blocks.

When a block is coded with inter-view motion prediction, a disparity vector is derived for selecting a corresponding block in a different view. Implicit disparity vector (IDV or a.k.a. derived disparity vector) is referred as to the disparity vector derived in the inter-view motion prediction. Even though the block is coded with motion prediction, the derived disparity vector is not discarded for the purpose of coding a following block.

In the current design of 3D-HTM 7.0, the NBDV process checks disparity motion vectors in the temporal neighboring blocks, disparity motion vectors in the spatial neighboring blocks, and then the IDVs in order. Once the disparity motion vector or IDV is found, the process is terminated.

Refinement of NBDV (NBDV-R) with accessing depth information is described. When one disparity vector is derived from the NBDV process, it is further refined by retrieving the depth data from reference view's depth map. The refinement process includes two steps:
 a) Locate a corresponding depth block by the derived disparity vector in the previously coded reference depth view, such as the base view; the size of the corresponding depth block is the same as that of the current PU.
 b) Select one depth value from four corner pixels of the corresponding depth block, and convert it to the horizontal component of the refined disparity vector. The vertical component of the disparity vector is unchanged.

The refined disparity vector is used for inter-view motion prediction while the unrefined disparity vector is used for inter-view residual prediction.

Advanced residual prediction (ARP) is described herein. Advanced residual prediction (ARP), applied to CUs with partition mode equal to Part_2N×2N (2N×2N for simplicity), was adopted in the 4th JCT3V meeting, as proposed in JCT3V-D0177.

Figure 7:
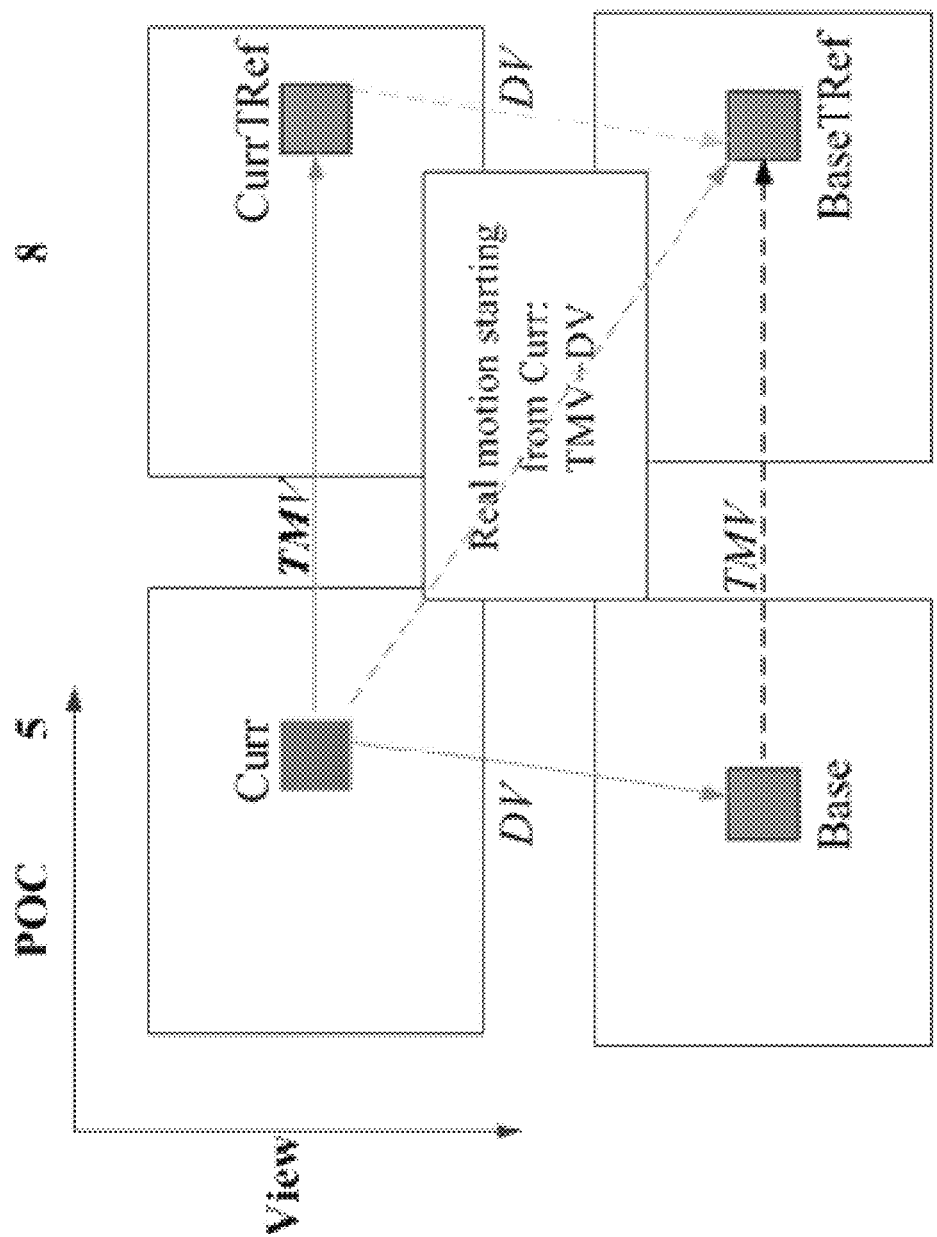
FIG. 7 is a conceptual diagram illustrating an example prediction structure of sub-PU ARP.

FIG. 7 is a conceptual diagram illustrating an example prediction structure of advanced residual prediction (ARP), which, in accordance with aspects of the disclosure, is performed at the sub-PU level. Each block discussed in conjunction with FIG. 7 is a sub-PU block. Each PU is split into two or more sub-PUs, where each sub-PU is a non-overlapping portion of the PU. FIG. 7 illustrates the prediction structure employed. As shown in FIG. 7, the following blocks are used during the process of predicting of the current block: "Curr," "Base," "CurrTRef," and "BaseTRef."

Curr is the block that is currently being coded. Base is a reference block in a picture that is a different view than the picture of the current block, but the same time as the reference block. The picture that Base is in is referred to as the reference view or the base view, while the picture that Curr is in is referred to as the current view. Base is derived from Curr by a disparity vector (DV), as discussed in greater detail below. The relationship between Curr and Base is shown in FIG. 7.

For example, the current view and the reference/base view may be different views, such as one for the left eye and one for the right eye, at the same time. However, in various examples, the views may be different in various different ways. In some examples, the different views discussed above are base depth views. In other examples, the different views are non-base depth views.

CurrTRef is a block in the same view that the block Curr is in but at a different time. CurrTRef is derived from Curr by a temporal motion vector (TMV) of Curr using motion compensation. CurrTRef is a motion-compensated block relative to Curr. The relationship between Curr and CurrTRef is shown in FIG. 7.

BaseTRef is a block in the same view as block Base and the same time as CurrTRef. BaseTRef is derived from Base by the temporal motion vector (TMV) of Curr. BaseTRef is identified with a vector of TMV+DV from the position of Curr. BaseTRef is a motion-compensated block relative to Base. The relationship of BaseTRef with Curr, Base, and CurrTRef is shown in FIG. 7.

During encoding, the TMV, the DV, a residual predictor, and a weighting factor w are calculated, and encoded in the bitstream, as discussed in greater detail below. During decoding, a final predictor of Curr is calculating by retrieving the TMV, the DV, the residual predictor, and w from the bitstream and using the retrieved information to calculate the final predictor.

During encoding, the residual predictor is calculated as BaseTRef−Base, where the subtraction operation is a pixel-wise subtraction applied to each pixel of the pixel arrays BaseTRef and Base. Additionally, during encoding, the weighting factor w is calculated, where the weighting factor is multiplied by the residual predictor while calculating the final predictor during decoding. Accordingly, the final predictor of the current block calculated during decoding is given by: CurrTRef+w*(BaseTRef−Base).

In some examples, three weighting factors are used in ARP, i.e., 0, 0.5 and 1. In some examples, the weighting factor from among 9. 0.5, and 1 leading to minimal rate-distortion cost for the current CU is selected as the final weighting factor, and the corresponding weighting factor index (in some examples, coded as 0, 1 and 2 which correspond to weighting factor 0, 1, and 0.5, respectively) is transmitted in the bitstream at the CU level. In some examples, all PU predictions in one CU share the same weighting factor. When the weighting factor is equal to 0, ARP is not used for the current CU.

The above descriptions and FIG. 7 apply to examples in which uni-directional prediction is applied. In other examples, bi-directional prediction is applied. In these examples, the above-described steps are applied for each reference picture list. When a current block uses an inter-view reference picture (in a different view) for one reference picture list, the residual prediction process is disabled.

Figure 8:
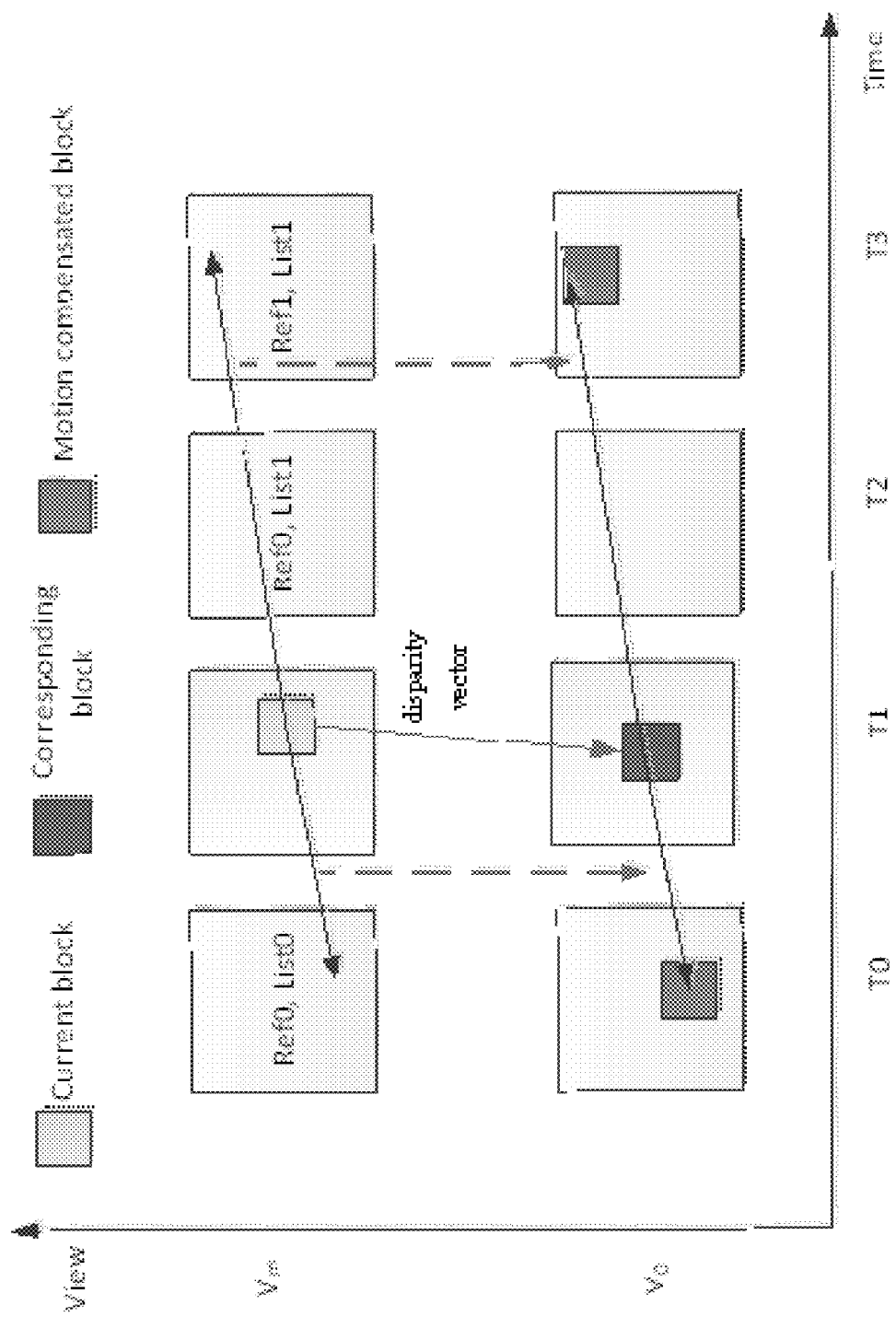
FIG. 8 is a conceptual diagram illustrating relationships between a current block, a reference block, and a motion compensated block.

FIG. 8 is a conceptual diagram illustrating relationships between a current block, a reference block, and a motion-compensated block, where each block is a sub-PU block. A decoding process of ARP with sub-PU blocks is described as follows.

First, a disparity vector (DV) is obtained, where the DV points to a target reference view ($V_0$). The current block Curr is in current view ($V_m$), while the reference view ($V_0$) is a different view than $V_m$. In some examples, the DV may be derived as specified in the current 3D-HEVC. Then, in the picture of the reference view within the same access unit, the corresponding block Base is located using the disparity vector. The DV added to the location of the current block gives the location of Base in the reference view ($V_0$). The picture of block Base has the reference view $V_0$, but is at has the same POC (Picture Order Count) value the picture of the current block, meaning that the picture of block Base is at the same time as block Base.

Next, BaseTRef is located. The vector TMV+DV added to the location of the current block gives the location of BaseTRef in the picture that includes BaseTRef. The relationship among a current block, corresponding block, and motion-compensated block is shown in FIG. 8. The reference picture in view $V_0$ that has the same POC value as the reference picture of view $V_m$ is selected as the reference picture of the corresponding block.

The weighted factor and residue block may be retrieved from the bitstream. The weighting factor (w) is applied to the residue block (BaseTRef–Base) to get a weighted residue block, and the values of the weighted residue block are added to the predicted samples. That is, as discussed above, the final predictor is calculated: CurrTRef+w*(BaseTRef–Base).

One example of reference picture selection via motion vector scaling may be performed as follows. In some examples, different pictures from the reference view may need to be accessed to generate the motion-compensated block (e.g., BaseTRef illustrated in FIG. 7) of the corresponding block. In some examples, the decoded motion vectors of the current sub-PU are scaled towards a fixed picture before applying TMV in the process discussed above, when the weighting factor is not equal to 0. In JCT3V-D0177, the fixed picture is defined as the first reference picture of each reference picture list if it is from the same view. In some examples, when the decoded motion vector does not point to the fixed picture, the decoded motion vector is first scaled and then used to identify CurrTRef and BaseTRef. Such a reference picture used for ARP may be referred to as the target ARP reference picture.

In some examples, the motion compensation may use interpolation filtering. In some examples, a bi-linear filter is applied during the interpolation process. In some examples, a conventional 8/4-tap filter may be applied during the interpolation process.

In some examples, the reference view is identified by the view order index returned from the NBDV process. In some examples, when the reference picture of one PU in one reference picture list is from a different view than the current view, ARP is disabled for this reference picture list.

In some examples, a disparity motion vector (DMV) may be used in place of the disparity vector (DV) in the examples discussed above. For example, the DMV may be used in placed of the DV for the derivation of Base and BaseTRef discussed above.

In some examples, ARP for inter-view residual is performed, as follows. When a current sub-PU uses an inter-view reference picture, prediction of an inter-view residual is enabled. When ARP for inter-view residual is performed, the inter-view residual within a different access unit is calculated, and then the calculated residual information is used to predict the inter-view residual of the current sub-PU block.

Figure 9:
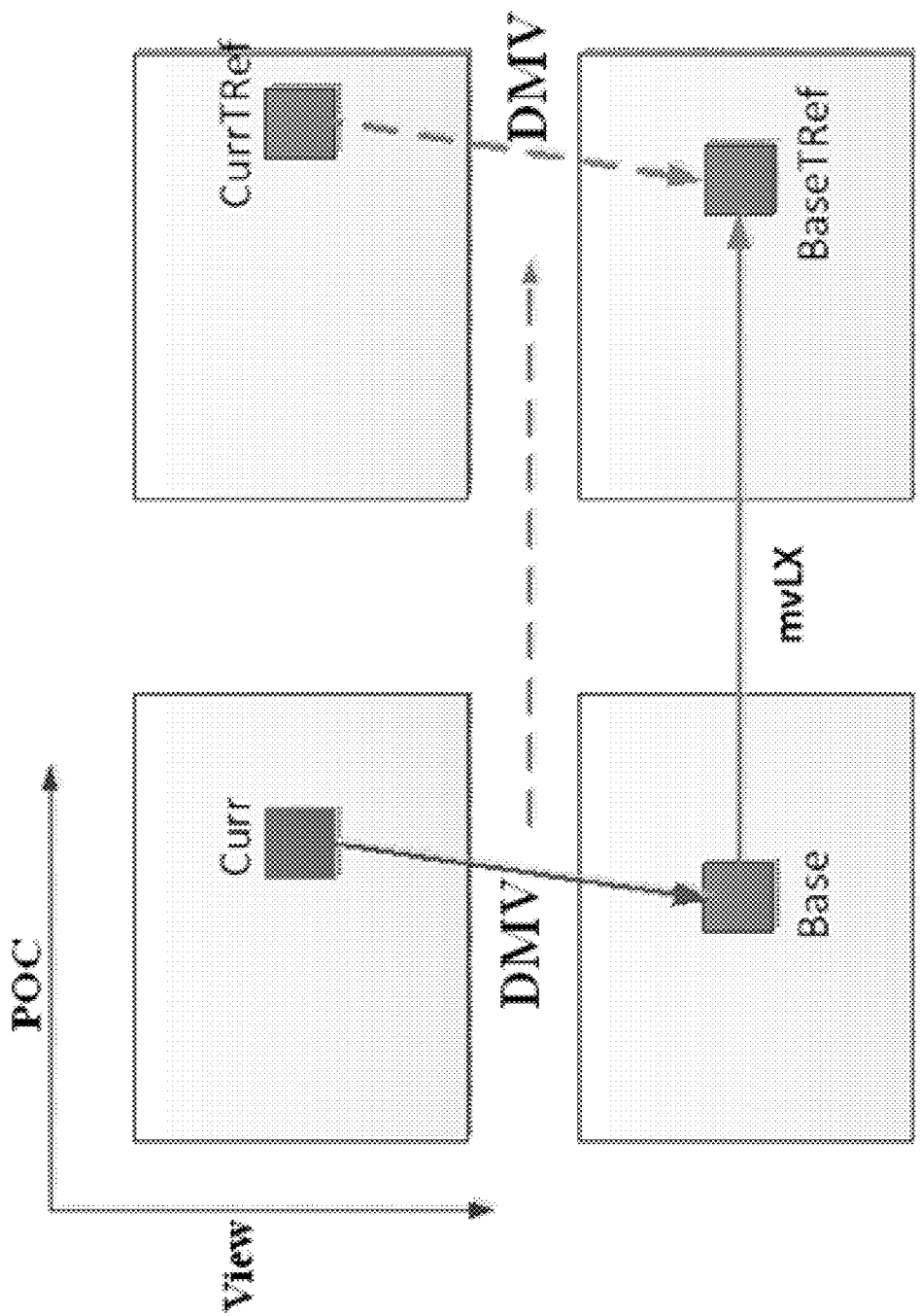
FIG. 9 is a conceptual diagram illustrating ARP for inter-view residual.

FIG. 9 is a conceptual diagram illustrating ARP for inter-view residual. The reference block Base is a block in the reference/base view that is located by the disparity motion vector (DMV) of the current block. The block CurrTRef is a block in a picture with the same view as the current block but with a different POC, and is located with a vector of TMV from the current block. The block BaseTRef is in a picture with the same view as Base and the same POC as BaseTRef, and is identified with a vector of mvLX+DMV from the current block.

The residual predictor of the residual signal of the current sub-PU may be calculated as: CurrTRef–BaseTRef, where the subtraction indicates pixel-wise subtraction.

A bi-linear filter may be used to generate the three relative blocks, in a similar manner as the current design of ARP for temporal residual prediction.

Also, when the temporal motion vector contained by Base points to a reference picture that is in a different access unit of the first available temporal reference picture of current sub-PU, in some examples, it is first scaled to the first available temporal reference picture, and the scaled motion vector is used to locate two blocks in a different access unit.

FIG. 9 shows an example of the derivation process of the inter-view predicted motion vector candidate.

In some examples, joint optimization of IC (Illumination Compensation) and ARP weighting factor signaling may be performed as follows.

The usage of IC may be indicated by a flag, i.e., ic_flag which may be signaled at the coding unit (CU) level while the ARP weighting factor, when signaled, is also at CU-level. In some examples, the signaling of the ic_flag is skipped when the ARP weighting factor is not equal to 0, to avoid the unnecessary signaling overhead of ic_flag.

In some examples, when ARP is used for inter-view residual, or when a disparity motion vector (DMV) is used instead of the DV, the block (CR) covering the center position of the reference block of current PU, is used for obtaining one temporal/disparity motion vector. However, the motion information of CR may be unavailable. In some examples, ARP for inter-view residual is disabled when the motion information of CR is unavailable, and ARP for temporal residual still uses the DV from the NBDV process. In some examples, when the motion information of CR is unavailable, one more block is checked. In some examples, the additional block is defined in a similar way as the temporal merging candidate, i.e., the PU (BR) that covers the bottom-right position of the reference block. In some examples, CR and BR are checked in order, and when no motion vector (with the desired type of temporal or disparity) is found in CR, the motion information associated with the BR block is used.

Some examples of checking an additional block are described as follows. In these examples, the samples may be defined as follows: the top-left sample of the current PU is defined as (x, y), and the size of current PU as W×H, the temporal/disparity motion vector of current PU is defined as: (mv[0], mv[1]); the center position of the reference block is defined as: (xRefPU, yRefPU), where xRefPU=x+W/2+((mv[0]+2)>>2); and yRefPU=y+H/2+((mv[1]+2)>>2); and the bottom-right position of the reference block is defined as : (xRefPU, yRefPU), where xRefPU=x+W+((mv[0 ]+2)>>2); and yRefPU=y+H+((mv[1]+2)>>2).

Figure 10:
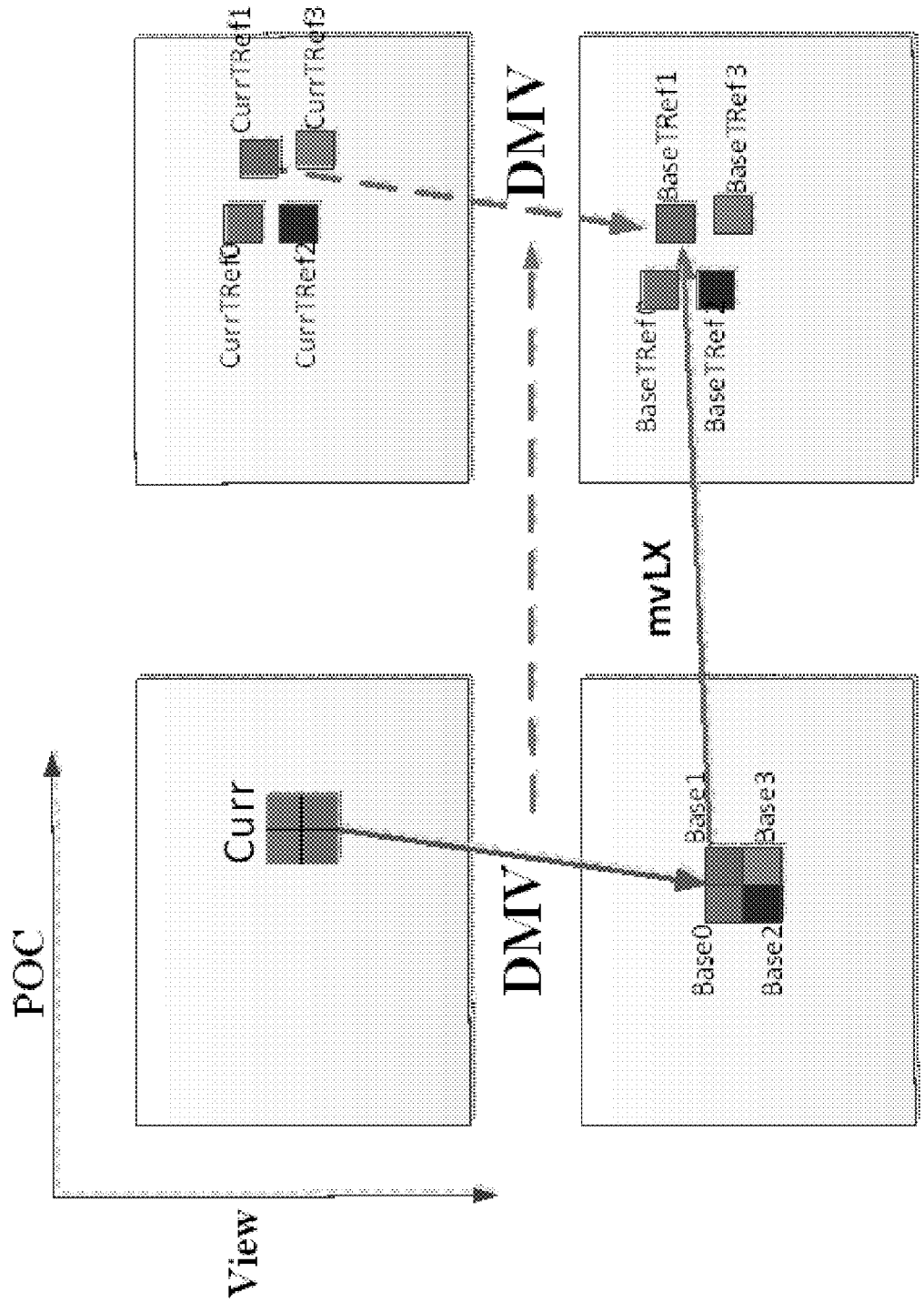
FIG. 10 is a conceptual diagram illustrating an example sub-PU based ARP for inter-view residual.

FIG. 10 is a conceptual diagram illustrating an example sub-PU based ARP for inter-view residual in which each PU is divided into four equally-sized, square-shaped sub-PUs. This example is shown and described by way of example only, because consistent with this disclosure, the PU may be divided in into two-or more sub-PUs in a variety of different ways in different examples. Also, FIG. 10 shows ARP being performed for one sub-PU of the PU, and shows the corresponding vectors for the sub-PU for which ARP is being performed. Although not shown in FIG. 10, each other sub-PU has its own set of motion vectors for use while ARP is performed for the sub-PU.

By performing ARP for either or both of temporal prediction residual and interview prediction residual, finer granularity of the disparity motion vector or temporal motion vector may be maintained for multiple blocks of a current prediction unit (PU) in a coding unit. Finer granularity of the motion vectors may enable each block within the current PU to identify its own Base, CurrTRef, and BaseTRef In some examples, and a separate residual is produced for each block of the current PU.

In some examples, ARP may be signaled for the whole coding unit (CU), indicating whether or not ARP is to be applied for the CU. When coding a CU for which ARP is signaled, the CU is divided into PUs, and each PU is divided into sub-PUs. For example, when sub-PU level ARP is applied to an inter-view residual, the current PU (e.g., Curr in FIG. 10) is divided into several sub-PUs. For each given (i-th) sub-PU, a reference block with the same size of a sub-PU in the same access unit of a reference view (e.g., Basei in FIG. 10) is identified by the disparity motion vector of a current PU (i.e., DMV in FIG. 10). If the corresponding reference block contains one temporal motion vector, it is used to locate two blocks (e.g., CurrTRefi and BaseTRefi) in a different access unit, and these two blocks are used to generate the residual predictor, as discussed in greater detail above. The two blocks are identified by the temporal motion information of the Basei and the DMV.

In some examples, only the temporal motion vector associated with a prediction unit containing one given position (e.g., a center position) of Basei is considered. In some examples, prediction units containing multiple positions (e.g., center and bottom-right) of Basei are checked in order, and once a temporal motion vector is found, the checking process is terminated.

In other examples, PU-level representative temporal motion information is first found, and considered as default motion information if available. When one or more given positions associated with Basei do not lead to available temporal motion information, the representative temporal motion information is assigned to the Basei.

In other examples, if no temporal motion vector is found, default motion information is applied. In some examples, the default motion information is defined as the temporal motion information contained by the reference block of a current PU identified by current disparity motion vector, where the reference block has the same size as current PU. In some examples, the default motion information is defined as a zero-valued motion vector, and the index of the temporal reference picture with the smallest index in a current reference picture list.

In some examples of sub-PU level ARP being applied to inter-view residual, the motion information of the corresponding region of the current PU (as identified by the DMV) may be accessed once in a way such that motion information of all blocks inside the region is accessed.

When sub-PU level ARP is applied to a temporal residual, the current PU is divided into several sub-PUs. For a given sub-PU, a reference block with the same size of the sub-PU in a different access unit of current view is identified by the same temporal motion vector of current PU. If the corresponding reference block of the sub-PU contains one disparity motion vector, the disparity motion vector is used to refine the disparity vector from NBDV process and identify two blocks in a reference view (Base, and BaseTRef). Otherwise, the disparity vector (e.g., derived by utilizing NBDV) is considered as the default vector and used to identify two blocks in a reference view. The two blocks in a reference view are used to generate the residual predictor.

In some examples, the size of one or more sub-PU may be equal to 8×8 pixels. In some examples, the size of one or more sub-PU may be larger than 8×8 pixels, e.g., as non-limiting examples: 8×16, 16×8, or 16×16 pixels. In some examples, the size of one or more sub-PU may be dependent on the size of a current PU or current CU. In some examples, the size of one or more sub-PU is not larger than a PU. For example, if in a given example design, a sub-PU size is 16×16, while the PU size is just 8×16, in this case, when sub-PU level ARP applies, for the particular PU, instead of considering the smallest processing size as 16×16, the smallest processing size for this PU is still 8×16.

In one example in which the required sub-PU (sub-CU) size is (K×L) and the PU size is (M, N), the actual processing size within a given PU is (min (K, M)×min (L, N)).

In some examples, the size of a sub-PU may be signaled in a video parameter set (VPS), sequence parameter set (SPS), picture parameter set (PPS) or slice header.

Although a partition size of 2N×2N is discussed in some examples, where N is a natural number, in other examples, a partition size other than 2N×2N may be employed. In other examples, ARP is applied only when the width and height of the PUs are both equal to or greater than eight pixels.

Figure 11:
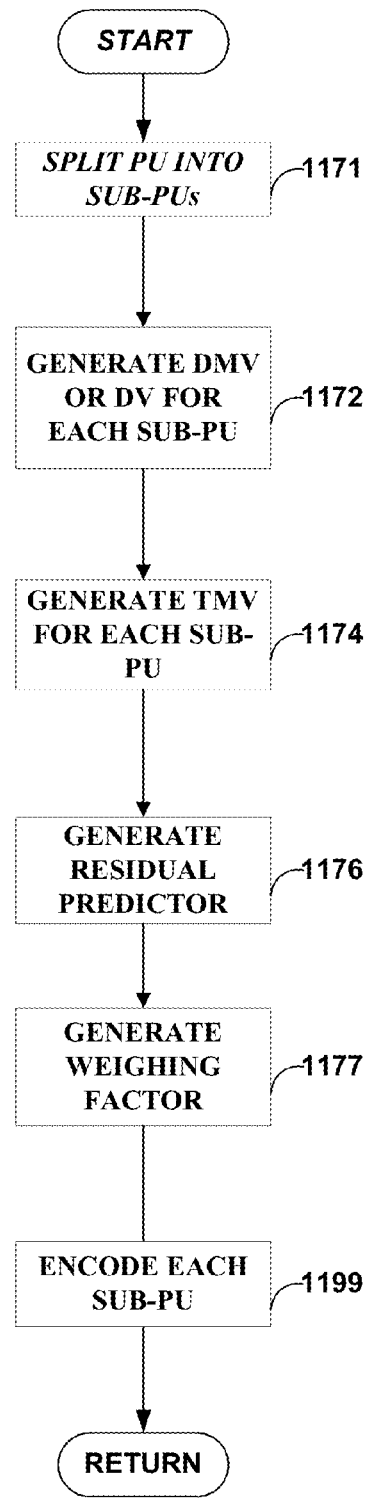
FIG. 11 is a flow diagram illustrating an example process for encoding video data that may be used as an example of the process of FIG. 4.

FIG. 11 is a flow diagram illustrating an example process (1170) for encoding video data. In some examples, the process of FIG. 11 may be performed by an encoder such as video encoder 20. After a start block, the encoder splits a prediction unit (PU) of a coding unit (CU) into two or more sub-PUs including a first sub-PU and a second sub-PU, such that the sub-PUs of the PU are non-overlapping portions of the PU (1171). When it is said that the PU is split into two or more sub-PUs, reference is being made to a conceptual split, so that subsequent actions may be performed separately to each separate sub-PU, as opposed to performing all actions on the entire PU.

The encoder then generates a disparity motion vector (DMV) or a disparity vector (DV) for each sub-PU of the PU (1172). The process employed to generate the DV or DMV may be similar, albeit different, to the process for generating a temporal motion vector in conventional motion compensation. It is different, however, in that rather than generating a vector demonstrating where a block has moved between a picture at one time at a picture at another time, the DMV or DV shows the change in position of a block between two different views at the same time, accordingly showing the disparity of the block's position in different views rather than motion over time. The process used at block 1172 also differs from conventional motion compensation in that the block is a sub-PU block.

The encoder then generates a temporal motion vector (TMV) is generated for each sub-PU of the PU (1174). The temporal motion vector may be generated via motion compensation techniques.

The encoder then generates a residual predictor for each sub-PU of the PU (1176). The residual predictor is denoted as: BaseTRef-Base, wherein the subtraction operation is a pixel-wise subtraction operation between the BaseTRef and Base. "Base" refers to the corresponding block identified with a vector of DV (or DMV in the case where a disparity motion vector is used rather than a disparity vector) compared with the current block, and "BaseTRef" refers to the corresponding block identified with a vector of DV+TMV (or DMV+TMV in the case where a disparity motion vector is used rather than a disparity vector) compared with the current block.

The encoder then generates a weighting factor is generated for each sub-PU of the PU (1177). In some examples, the weighting factor is either 0, 0.5, or 1, and the weighting factor is generated by determining which of the possible weighting factors or 0, 0.5, or 1 would lead to the lowest rate-distortion cost. In some examples, one weighting factor is determined for an entire CU and all coded portions of the CU use the same weighting factor. In other examples, separate weighting factors may be calculated and stored for each separate portion of the CU.

The encoder then encodes portions of the CU corresponding to each sub-PU of the PU according to advanced residual prediction (ARP) (1199). The process then advances to a return block, where other processing is resumed.

In this manner, the method of FIG. 11 represents an example of a method including splitting a prediction unit (PU) of a coding unit (CU) into two or more sub-PUs including a first sub-PU and a second sub-PU, such that the sub-PUs of the PU are non-overlapping portions of the PU, obtaining a first motion vector of a first type for the first sub-PU and a second motion vector of the first type for the second sub-PU, obtaining a third motion vector of a second type for the first sub-PU and a fourth motion vector of the second type for the second sub-PU, such that the second type is different than the first type, encoding a first portion of the CU corresponding to the first sub-PU according to advanced residual prediction (ARP) using the first motion vector and the third motion vector, and encoding a second portion of the CU corresponding to the second sub-PU according to ARP using the second motion vector and the fourth motion vector.

Figure 12:
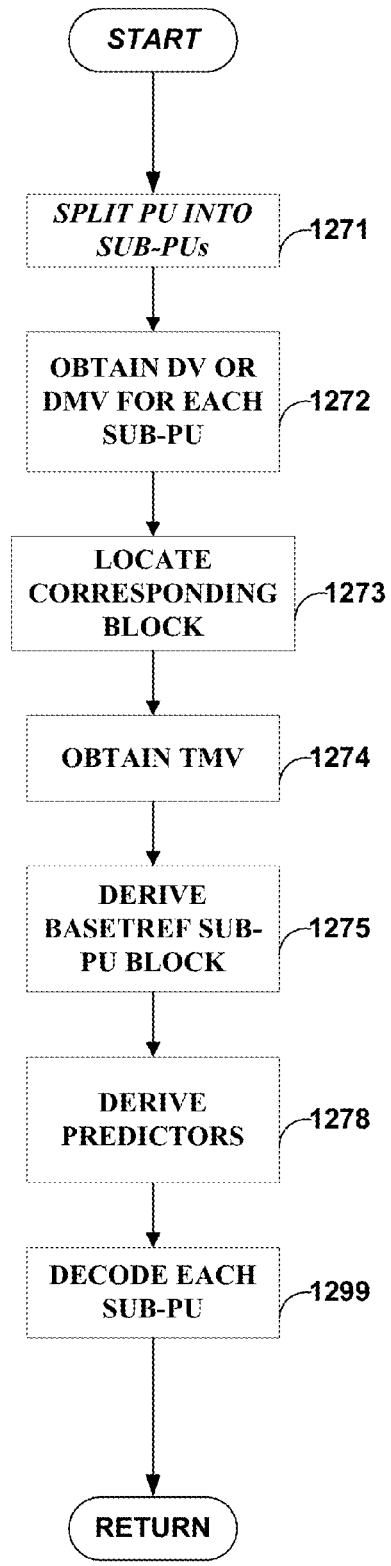
FIG. 12 is a flow diagram illustrating an example process for decoding video data that may be used as an example of the process of FIG. 4.

FIG. 12 is a flow diagram illustrating an example process (1270) for coding video data. In some examples, the process of FIG. 12 may be performed by a decoder, such as video decoder 30 or the like. After a start block, the decoder splits a prediction unit (PU) of a coding unit (CU) into two or more sub-PUs including a first sub-PU and a second sub-PU, such that the sub-PUs of the PU are non-overlapping portions of the PU (1271).

The decoder then obtains a disparity motion vector (DMV) or a disparity vector (DV) for each sub-PU of the PU (1272). In some examples, the DMV or DV is obtained by retrieving the DMV or DV from the bitstream. The decoder then locates the sub-PU block corresponding the current sub-PU in a different view (1273). This is accomplished using the DMV or DV obtained at block 1272 from the location of the current sub-PU.

The decoder then generates a temporal motion vector (MV) is generated for each sub-PU of the PU (1274). In some examples, the TMV is obtained by retrieving the TMV from the bitstream. The decoder then provides the corresponding sub-PU block in BaseTRef (1275). This is accomplished using DV+TMV (or DMV+TMV, if a disparity motion vector was used rather than a disparity vector) from the location of the current sub-PU.

The decoder then derives the predictors (1278). This may be accomplished by retrieving the residual predictor and the weighting factor from memory, applying the weighting factor to the residue block to get a weighted residue block, and adding the values of the weighted residue block to the predicted samples. The decoder then decodes portions of the CU corresponding to each sub-PU of the PU according to advanced residual prediction (ARP) (1299). The process then proceeds to a return block, where other processing is resumed.

In this manner, the method of FIG. 12 represents an example of a method including splitting a prediction unit (PU) of a coding unit (CU) into two or more sub-PUs including a first sub-PU and a second sub-PU, such that the sub-PUs of the PU are non-overlapping portions of the PU, determining a first motion vector of a first type for the first sub-PU and a second motion vector of the first type for the second sub-PU, determining a third motion vector of a second type for the first sub-PU and a fourth motion vector of the second type for the second sub-PU, such that the second type is different than the first type, decoding a first portion of the CU corresponding to the first sub-PU according to advanced residual prediction (ARP) using the first motion vector and the third motion vector, and decoding a second portion of the CU corresponding to the second sub-PU according to ARP using the second motion vector and the fourth motion vector.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   splitting a prediction unit (PU) of a coding unit (CU) into two or more sub-PUs including a first sub-PU and a second sub-PU, such that the two or more sub-PUs of the PU are non-overlapping portions of the PU;
   determining a first motion vector of a first type for the first sub-PU and a second motion vector of the first type for the second sub-PU;
   determining a third motion vector of a second type for the first sub-PU and a fourth motion vector of the second type for the second sub-PU, such that the second type is different than the first type;
   decoding a first portion of the CU corresponding to the first sub-PU according to advanced residual prediction (ARP) using the first motion vector and the third motion vector; and
   decoding a second portion of the CU corresponding to the second sub-PU according to ARP using the second motion vector and the fourth motion vector.

2. The method of claim 1, wherein a size of the first sub-PU and a size of the second sub-PU are equal.

3. The method of claim 1, wherein a size of the second sub-PU is different than a size of the first sub-PU.

4. The method of claim 1, wherein a size of the first sub-PU is eight pixels by eight pixels.

5. The method of claim 1, wherein a size of the first sub-PU is at least eight pixels by at least eight pixels.

6. The method of claim 1, wherein decoding the first portion of the CU includes:
   in a picture in a reference view, using the first motion vector from a current block to locate a respective corresponding block in another picture;
   obtaining a first reference block in a current view using the third motion vector from the current block;
   using the first motion vector and the third motion vector to obtain a second reference block from the current block;
   obtaining a residual predictor based, at least in part, on the first reference block and the second reference block;
   obtaining a weighting factor;
   applying the weighting factor to the residual predictor to obtain a weighted residue block; and
   decoding the first portion of the CU using the weighted residue block and the respective corresponding block.

7. The method of claim 1, wherein decoding the first portion of the CU includes:
   calculating a first predicted value for the first portion of the CU using the third motion vector;
   calculating a second predicted value for the first portion of the CU using a difference between a respective corresponding block identified by the first motion vector and an inter-view reference block identified by the third motion vector when applied to the respective corresponding block; and
   decoding the first portion of the CU using the first predicted value and the second predicted value.

8. The method of claim 1, wherein coding the portion of the CU comprises:
   calculating a first predicted value for the first portion of the CU using the first motion vector;
   calculating a second predicted value for the first portion of the CU using a difference between a reference block identified by the third motion vector and an interview reference block identified by the third motion vector when applied to the reference block; and
   calculating an actual predicted value for the first portion of the CU from a combination of the respective first predicted value and the respective second predicted value.

9. The method of claim 1, wherein the first type includes a temporal motion vector and the second type includes a disparity motion vector.

10. The method of claim 1, wherein the first type includes a temporal motion vector and the second type includes a disparity vector.

11. The method of claim 1, wherein the third motion vector and the fourth motion vector include the same motion vector.

12. The method of claim 1, wherein a size of the first sub-PU and a size of the second sub-PU is signaled in a video parameter set (VPS).

13. The method of claim 1, wherein the second type includes a temporal motion vector.

14. The method of claim 13, wherein the first type includes a disparity motion vector.

15. The method of claim 13, wherein the first type includes a disparity vector.

16. The method of claim 13, wherein determining the third motion vector includes:

determining a temporal motion vector for the CU as a default temporal motion vector; and using the temporal motion vector for the CU as the third motion vector when a corresponding block identified by at least one disparity motion vector applied to the CU does not have temporal motion information available.

17. A method of encoding video data, the method comprising:

splitting a prediction unit (PU) of a coding unit (CU) into two or more sub-PUs including a first sub-PU and a second sub-PU, such that the two or more sub-PUs of the PU are non-overlapping portions of the PU;

obtaining a first motion vector of a first type for the first sub-PU and a second motion vector of the first type for the second sub-PU;

obtaining a third motion vector of a second type for the first sub-PU and a fourth motion vector of the second type for the second sub-PU, such that the second type is different than the first type;

encoding a first portion of the CU corresponding to the first sub-PU according to advanced residual prediction (ARP) using the first motion vector and the third motion vector; and encoding a second portion of the CU corresponding to the second sub-PU according to ARP using the second motion vector and the fourth motion vector.

18. The method of claim 17, wherein encoding the first portion of the CU includes:

obtaining a residual predictor for the first sub-PU using the first motion vector and the third motion vector;

obtaining a weighting factor for the first sub-PU; and encoding the first sub-PU using a weighted residual predictor obtained from application of the weighting factor to the residual predictor.

19. The method of claim 17, wherein the first type includes a temporal motion vector and the second type includes a disparity motion vector.

20. The method of claim 17, wherein the first type includes a temporal motion vector and the second type includes a disparity vector.

21. The method of claim 17, wherein the third motion vector and the fourth motion vector include the same motion vector.

22. The method of claim 17, wherein the second type includes a temporal motion vector.

23. The method of claim 22, wherein the first type includes a disparity motion vector.

24. The method of claim 22, wherein the first type includes a disparity vector.

25. A device for coding video data, the device comprising:
a memory configured to store video data; and
one or more processors coupled the memory and configured to:

split a prediction unit (PU) of a coding unit (CU) into two or more sub-PUs including a first sub-PU and a second sub-PU, such that the two or more sub-PUs of the PU are non-overlapping portions of the PU;

obtain a first motion vector of a first type for the first sub-PU and a second motion vector of the first type for the second sub-PU;

obtain a third motion vector of a second type for the first sub-PU and a fourth motion vector of the second type for the second sub-PU, such that the second type is different than the first type;

code a first portion of the CU corresponding to the first sub-PU according to advanced residual prediction (ARP) using the first motion vector and the third motion vector; and code a second portion of the CU corresponding to the second sub-PU according to ARP using the second motion vector and the fourth motion vector.

26. The device of claim 25, wherein the first type includes at least one of a disparity vector or a disparity motion vector.

27. The device of claim 25, wherein the second type includes a temporal motion vector.

28. The device of claim 25, wherein the device is a video encoder configured to encode the first portion of the CU and to encode the second portion of the CU.

29. The device of claim 25, wherein the device is a video decoder configured to decode the first portion of the CU and to decode the second portion of the CU.

30. A non-transitory computer-readable storage medium having stored thereon instructions that, when executed, cause at least one processor to:

split a prediction unit (PU) of a coding unit (CU) into two or more sub-PUs including a first sub-PU and a second sub-PU, such that the two or more sub-PUs of the PU are non-overlapping portions of the PU;

obtain a first motion vector of a first type for the first sub-PU and a second motion vector of the first type for the second sub-PU;

obtain a third motion vector of a second type for the first sub-PU and a fourth motion vector of the second type for the second sub-PU, such that the second type is different than the first type;

code a first portion of the CU corresponding to the first sub-PU according to advanced residual prediction (ARP) using the first motion vector and the third motion vector; and code a second portion of the CU corresponding to the second sub-PU according to ARP using the second motion vector and the fourth motion vector.

* * * * *